United States Patent [19]

Otto

[11] Patent Number: 4,863,278

[45] Date of Patent: Sep. 5, 1989

[54] UNIVERSAL KITCHEN MACHINE

[75] Inventor: Friedrich Otto, Hameln, Fed. Rep. of Germany

[73] Assignee: A. Stephan u. Soehne GmbH & Co., Hameln, Fed. Rep. of Germany

[21] Appl. No.: 740,833

[22] Filed: Jun. 3, 1985

[30] Foreign Application Priority Data

Feb. 11, 1985 [EP] European Pat. Off. ........ 85101418.3

[51] Int. Cl.[4] ......................... B01F 7/20; B01F 13/04; A47J 43/046; A47J 43/07

[52] U.S. Cl. .................................... 366/143; 366/185; 366/247; 366/314; 366/347; 366/601; 241/272.2

[58] Field of Search ............... 366/143, 185, 247, 251, 366/314, 601, 205, 309, 347; 241/199.7, 199.12, 282.1, 282.2, 285 R, 135, 101 R, 101 B, 98, 37.5; 220/254, 336, 337, 344, 378, 342, 343

[56] References Cited

U.S. PATENT DOCUMENTS

| | | | |
|---|---|---|---|
| 1,761,237 | 6/1930 | Schiff | 366/185 |
| 1,896,330 | 2/1933 | Ruppel | 220/336 |
| 1,933,764 | 11/1933 | Ruth, Jr. | 241/38 |
| 2,246,054 | 6/1941 | Marty | 241/282.1 X |
| 2,678,073 | 5/1954 | de Nardis | 241/282.2 X |
| 2,894,551 | 7/1959 | Otto | 241/282.1 X |
| 2,918,956 | 12/1959 | Otto | 241/282.1 X |
| 3,240,435 | 3/1966 | Otto | 241/285 X |
| 3,313,332 | 4/1967 | Stephan et al. | 241/282.1 X |
| 3,434,518 | 3/1969 | Motis | 241/199.12 |
| 3,700,176 | 10/1972 | Haber | 241/199.7 X |
| 3,884,423 | 5/1975 | Wilson | 241/282.1 |
| 3,957,215 | 5/1976 | Otto et al. | 241/282.1 |
| 4,100,612 | 7/1978 | Hoover et al. | 366/247 X |
| 4,135,828 | 1/1979 | Cabak | 366/197 |
| 4,285,473 | 8/1981 | Williams | 241/282.1 X |
| 4,297,038 | 10/1981 | Falkenbach | 241/282.1 X |
| 4,387,860 | 6/1983 | Necas et al. | 241/282.1 |
| 4,613,086 | 9/1986 | Granum et al. | 241/101 B |

FOREIGN PATENT DOCUMENTS

| | | | |
|---|---|---|---|
| 85743 | 6/1958 | Denmark | 241/199.12 |
| 965109 | 5/1957 | Fed. Rep. of Germany . | |
| 965776 | 6/1957 | Fed. Rep. of Germany . | |
| 168973 | 5/1934 | Switzerland . | |
| 751067 | 6/1956 | United Kingdom | 241/199.12 |
| 2041140 | 9/1980 | United Kingdom | 241/292.1 |

*Primary Examiner*—Harvey C. Hornsby
*Assistant Examiner*—Scott J. Haugland
*Attorney, Agent, or Firm*—Foley & Lardner, Schwartz, Jeffery, Schwaab, Mack, Blumenthal & Evans

[57] ABSTRACT

The invention relates to a universal machine for the comminution, cutting, mixing, kneading, emulsifying, etc., of foods. The machine comprises a bowl with a circular cross section. The bowl according to the invention is supported on a supporting stand, and may be tipped around a tilting axle arranged horizontally under the bottom of the bowl. The bowl may be arrested in any desired tipped position. The machine further comprises a closable lid, a plurality of centered, rotating tools mounted on a tool shaft, and a motor for driving the tools disposed under the tilting axle and flanged onto the bottom of the bowl. Switching means for the motor are provided laterally on the machine. To simplify the handling of the machine and facilitate its cleaning, the switching means are housed in a control box which functions as a component of a stand for the bowl. The control box also contains the bearing for one end of the pivot axle and the electric lines to the motor.

30 Claims, 9 Drawing Sheets

UNIVERSAL KITCHEN MACHINE

BACKGROUND OF THE INVENTION

The invention relates to a universal machine for the comminution, cutting, mixing, kneading, emulsifying, etc., of foods. The machine comprises a bowl with a circular cross section. The bowl according to the invention is supported on a supporting stand, and may be tipped around a tilting axle arranged horizontally under the bottom of the bowl. The bowl may be arrested in any desired tipped position. The machine further comprises a closable lid, a plurality of centered, rotating tools mounted on a tool shaft, and a motor for driving the tools disposed under the tilting axle and flanged onto the bottom of the bowl. Switching means for the motor are provided laterally on the machine.

A machine of this type is described in DE 965 776. Such machines have been used for many years in a number of applications, e.g., for the processing of meat, vegetables, and fruit, the preparation of dumpling dough, bread dough and mayonnaise and the emulsifying of soups, sauces and salad dressing. With additional accessories, such a universal machine may further be used for straining, grating, mashing, rasping, chopping, tenderizing and grinding. The accessories are mounted on the lid of the bowl when the lid is tilted by 90°. To aid the entire working process, a conveyor blade is frequently provided in these machines. The conveyor blade projects into the bowl and is actuated from the outside by a manual crank (DE 965 109).

The support frame is in the form of a tubular or cast stand. The switching device is attached laterally on the bowl and the electric leads from the motor to the switching device pass through the hollow tilting axle. The housing of the switching device also functions as a mechanical opening lock for the lid. The tool shank for carrying the tools is slipped onto, and fixed in rotation with the motor shaft. The motor shaft passes through the bottom of the bowl and projects into the bowl.

SUMMARY OF THE INVENTION

It is an object of the invention to simplify the operation of the above-described machine and to facilitate its cleaning.

This object is attained, according to the invention, by placing the switching device into a control box formed as a stand for the bowl, by having the stand hold the bearings for one end of the tilting axle, and by designing the tilting axle to be hollow for containing the electric leads to the motor.

According to the present invention, it is therefore provided a universal kitchen machine for the comminution, cutting, mixing, kneading, emulsifying and the like of foods, comprising, a bowl with a circular cross-section, and including a bottom and an open top, a hollow tilting axle having first and second ends, disposed horizontally beneath the bottom of the bowl, connected with the bowl, and functioning to tip the bowl, a first bearing for rotatingly supporting the first end of the tilting axle, means for arresting the bowl in any desired tipped position, a second bearing for rotatingly supporting the second end of the tilting axle, a support stand for supporting the tilting axle, a closable lid for closing the top of the bowl, and having a center, rotating tools centered in the bowl, a tool shank for supporting the tools, a first drive motor for driving the tools, flanged to the bottom of the bowl, and disposed beneath the tilting axle, switching means for the drive motor, disposed to the side of the bowl, control box for containing the switching means and for functioning as a component of the stand, wherein the control box contains the first bearing, and a first plurality of electric lines from said motor to the switching means, disposed in the hollow tilting axle.

Further objects, features and advantages of the present invention will become apparent from the detailed description of preferred embodiments, when considered together with the attached figures of drawing.

DESCRIPTION OF PREFERRED EMBODIMENTS

Figure 1:
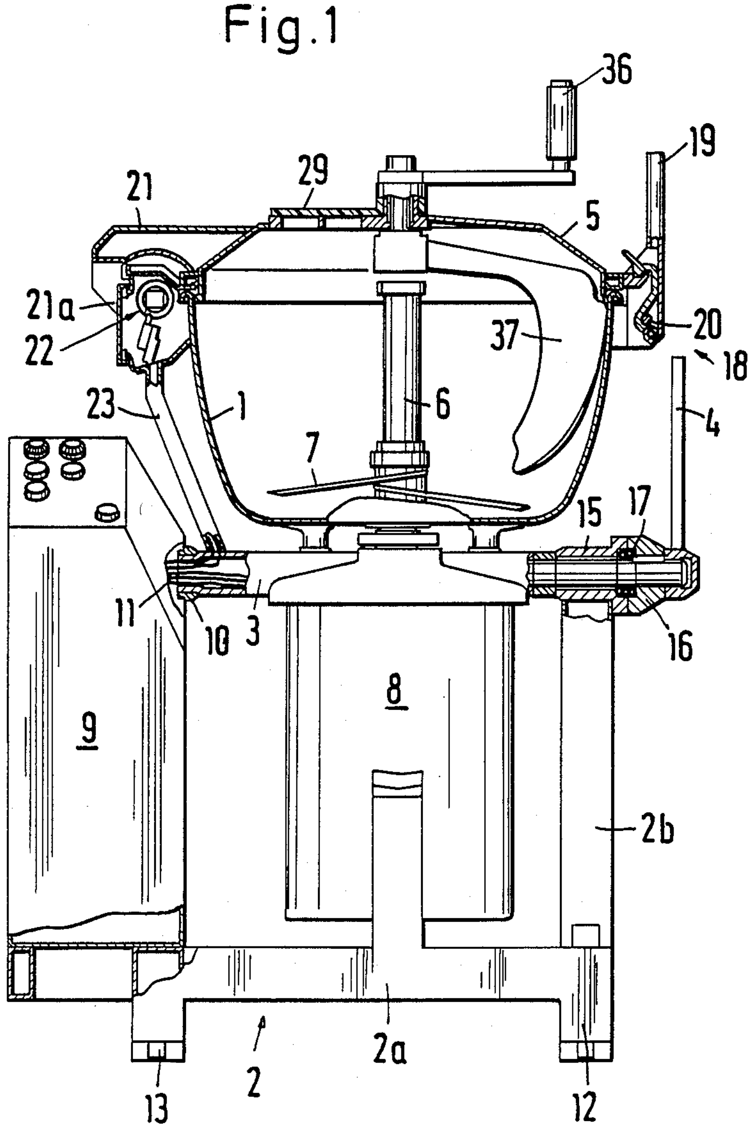
FIG. 1 shows a front elevation of a universal kitchen machine according to the invention partly cut away.

Previously, the switching devices have always tilted with the bowl; the new control box is stationary. The outer walls of the control box have smooth surfaces so that cleaning may be accomplished without difficulty. This is especially important in food machines. It is convenient to have the control cabinet screw into the bottom part of the supporting stand, in order to make it readily replaceable. The control box may be expanded simply, by modular construction. The control box may further comprise a gear motor having, for example, a drive for accessories projecting from the wall of the control box that faces away from the bowl. The gear motor would thus be independent of the motor flanged onto the bottom of the bowl. In order to save space, accessories, such as for cutting and dicing vegetables and potatoes, may be simply attached to the side of the control box without tilting the bowl. It is therefore possible to operate the universal machine simultaneously with the accessories. For example, one operator can work the basic machine, cutting or emulsifying, while a second opertor cuts french fries or dices parallel to the first operation.

The control box contains all devices for actuating, braking or the like. The continuous regulation of the rotating velocity is possible by frequency control. An electronic braking device for the motor may be provided in the control box, for example. A mechanical motor brake is also conceivable. This brake can be installed on the B side of the motor. A second end of the motor shaft may be provided for th brake, protruding from the bottom side of the motor. The mechanical brake, a disk brake for example, may be actuated electrically by means of a coil. The electric lines for the brake also pass through the hollow tilting axle to the control box. If the universal machine is to be equipped with a vacuum device, the vacuum pump required, together with its accessories, may also be housed in the control box.

The necessary switching and operating displays are provided on the top or front side of the control box, respectively. Touch control means may also be provided for operating the motor for driving the tools for very short periods of time. A circuit of this type, is, for example, highly advantageous for cutting salads; merely by touching the appropriate switch, the drive motor is actuated for a few seconds.

A first box hinge for pivoting the lid of the bowl, and for containing a safety device, may be welded to the lid and arranged with a second box hinge on the bowl. A torsion spring may be provided to faciliate opening the lid. The safety device for the lid preferably comprises a cam-controlled terminal switch. When the lid is opened during the working process, the drive motor is thus automatically deactivated. The electric lines to the box hinge are preferably conducted through a water-tight electrical conduit lead along the outside of the bowl and opening into the hollow tilting axle. A protected cable line into the box hinge is thus assured. In this manner, the box hinge may be designed to accept optional control parts, if necessary.

In known machines, the lid of the bowl is a casting, and therefore particularly expensive to manufacture and difficult to clean. According to the invention, the lid may comprise a drawn chromium-nickel steel part with a punched opening. A precision case segment including viewing orifices is welded in the punched opening. The precision casing requires finishing on its outside surface only. A ring having an approximately U-shaped cross section, and for receiving a rope seal may be welded to the edge region of the drawn part. In addition, the groove of this ring is mostly open in the radial direction, and may therefore be simply and reliably cleaned. Simple removal and insertion of th rope seal is thereby also assured.

The precision cast segment is preferably closed by means of a viewing-cover comprising a synthetic plastic material. The viewing-cover is centered on, and rotates on the lid of the bowl. It is advantageous if the viewing-cover is seated in a water- and vacuum-tight manner in its closed positions, by means of a round rope seal. The precision cast segment is finished in the region where the seal is seated. It is also advantageous to provide the viewing-cover with a centered bearing bush for fitting onto a hub of the bowl lid. When the viewing window is in an open position, a pin engages a vertical groove; upon rotation of the viewing-cover toward a closed position, the pin enters into a circumferential groove section having a thread like rise directed against the lid. The pin may be located in the bearing bush, and the groove in the hub of the bowl lid, or vice versa. The viewing-cover is positively locked onto the bowl lid by rotation into the closed position. This assures that the viewing-cover is always seated to form a seal on the precision cast segment.

A manual crank for the conveyor blade in the bowl is preferably supported on the bearing bush of the viewing cover. For a thorough cleaning of the machine, the viewing cover may be easily pulled off in the upward direction. After the removal of the manual crank and the conveyor blade, the viewing-cover may be removed by rotating it into its open position. Furthermore, the operator can easily remove the rope seal of the sight cover and then intensively clean the entire viewing-cover in a washingmachine.

The configuration of the bowl lid according to the invention thus solves a highly complex problem. On the one hand, the aforementioned viewing orifices should be large enough to permit the visual and olefactory monitoring of the material to be prepared, as well as optional later introduction of spices or other additives. On the other hand, the viewing orifices should be capable of being closed so that observation will remain possible during processing. The closed position must be tight against water spray and must permit working in a vacuum. Furthermore, the viewing orifices with their viewing cover must be designed so that easy and reliable cleaning is assured. As the machine should be capable of operating in a vacuum, the viewing-cover must be rigid enough to exclude the possibility of indentation. These requirements are advantageously met by the aforementioned drawn part and the precision cast segment.

The bowl lid preferably has an eccentric toggle lever lock. The lock comprises a readily-removable rotating axle for supporting the manual crank. The axle is secured in its working position by a hinged axle-end. By these means, the manual crank, and the toggle lever articulated onto the manual crank, may be rapidly and simply released from the container. This construction also satisfies the hygienic requirements of the invention.

The means for arresting the bowl in the tilted position may comprise a stationary first toothed wheel and a second toothed wheel connected with the tilting axle, wherein the toothed wheels are made to engage one another by the displacement of a tension lever against the bias of a spring. In this manner the bowl may be arrested in almost any desired tilted position.

The free end of the drive shaft which protrudes into the bowl through the bottom may comprise an undercut radial slot which opens upwardly. A transverse bolt of the tool shank engages the slot as the shank is mounted on the drive shaft. Tools may be interchangeably mounted on the tool shaft. The tool shaft is thus suspended with its transverse bolt in the radial slot. The undercut of the slot allows even a slight relative rotation between the tool shank and the drive shaft to produce a reverse grip by the transverse bolt and thus axially fix the tool shank. Such a relative rotation takes place automatically both upon the action and the braking of the drive motor, and by the action of the inertial and frictional forces acting on the tools by the material to be processed. It is therefore no longer necessary to secure the tool shaft on top with a nut.

The tool shank preferably has a square cross section. This provides for spinning ribs for processing the material in the bowl. These ribs are especially important during the working of homogeneous masses, which tend to adhere to the vertical tool shank and restrict the exit of the air. Rapid rotation of the tool shaft with its square cross section creates an annular channel surrounding the tool shank and free of the processed mass. This assures the permanent deaeration of the mass.

The tool shaft preferably comprises a pipe of chromium-nickel stell with a square cross section. This pipe is placed over an elongated first bushing and welded to the ends of the bushing. This elongated bushing may be cost effectively manufactured, as it is merely necessary to rough turn it. A shorter second bushing comprising a precision casting, and containing the aforementioned transverse bolt, may be welded to the upper end of the elongated bushing, and to the square steel pipe. A square ring may be placed onto the lower end of the elongated bushing and also welded to the square pipe. The lower end of the elongated bushing may further be provided with external threads upon which a tension nut is screwed, wherein the nut is equipped with spinning ribs on its outer circumference. In this manner, the tools may be simply replaced so that the operator of the machine may use different tools with a single tool shaft. The tool shaft according to the invention has no slits, gaps or the like and thus efficiently satisfies the strict hygienic requirements of a food processing machine.

The support stand of the machine comprises a preferably U-shaped, horizontal base section, assembled by welding square tubing. This base section may have at least two feet of square cross section. A hard rubber bumper equipped with a roller is inserted in each foot. By these means, the axial position of the preferably nylon rollers may be altered as desired by the operator. The machine may be displaced forward, rearward or laterally. The end of the tilting axle facing away from the control box may be supported on bearings in the upper end of a free stand. The free stand extends freely and diagonally upward from an attachment point in the rear on the base section of the support stand. The free stand may also comprise square tubing. The U-shaped base section, open in the rear, allows the motor suspended under the bowl to freely pivot rearward. A receptacle for a tool shank is provided in the front corner area of the base section facing away from the control box. The receptacle is designed to correspond to the free end of the motor shaft which protrudes into the bowl. The tool shank, rotated by 180°, may be set in a radial slot of the receptacle with its transverse bolt. The receptacle works like a wrench, so that the operator may release the tool from the tool shank in a simple manner.

The universal kitchen machine shown in FIG. 1 comprises a bowl 1 having a circular cross section; a tilting axle 3 for tipping the bowl, located horizontally underneath the bottom of the bowl; a support stand 2 for supporting the tilting axle on bearings; a tension lever 4 for tipping the bowl; and means for arresting the bowl in any desired position. The machine further comprises a sealable lid 5 and centered, rotating tools 7. The tools 7 are fastened to a tool shank 6, and driven by a motor 8. The motor is flanged onto the bottom of the bowl and located under the tilting axle 3. Switching means for the motor 8 are housed laterally in a control box 9. The control box 9 is in the form of a stand for the bowl 1 and holds the bearing 10 for a first end of the tilting axle 3. The axle 3 is hollow and contains the electric lines 11 to the motor 8. The control box 9 is screwed together with the bottom part 2*a* of the support stand 2 and is therefore readily replaceable.

Figure 6:
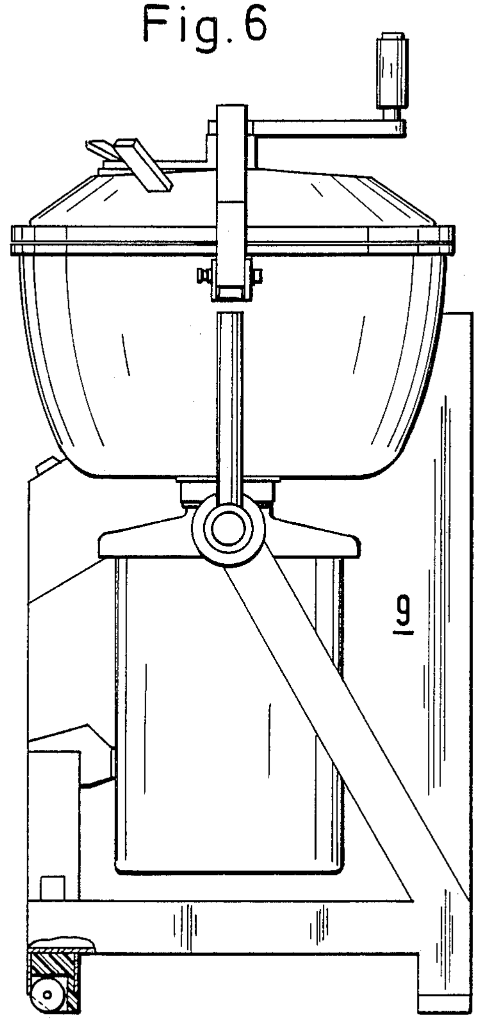
FIG. 6 is a partially cut-away side view from the right in FIG. 4.

A second end of the tilting axle 3 is bearingly supported in the upper end of a free stand 2*b*. The free stand extends freely and diagonally upward from a rear point of attachment 2*c* on the base section2*a*. The base section 2*a* of the support stand 2 has two feet 12 with square cross section. A hard rubber bumper 14, equipped with a roller 13, is set into each of the feet (FIGS. 3 and 6).

The means for arresting the bowl 1 in a desired position comprise a first stationary toothed wheel 15 and a second toothed wheel 16 connected with the pivot axle 3. The toothed wheels may be brought into mutual engagement by displacing the tension lever 4 against the action of a spring 17.

the bowl lid 5 has an eccentric toggle lock 18 including an easily-withdrawn, rotating axle 20 for supporting the manual lever 19. A first box hinge 21 is welded to the bowl lid 5. The first hinge 21 cooperates with a second box hinge 21*a* attached to the bowl 1. An electric cover safety device 22 is located in the second hinge. The electric lines of the safety device 22 are conducted through a water tight electrical conduit 23 located outside the bowl 1, and into the hollow pivot axle 3.

Figure 2:
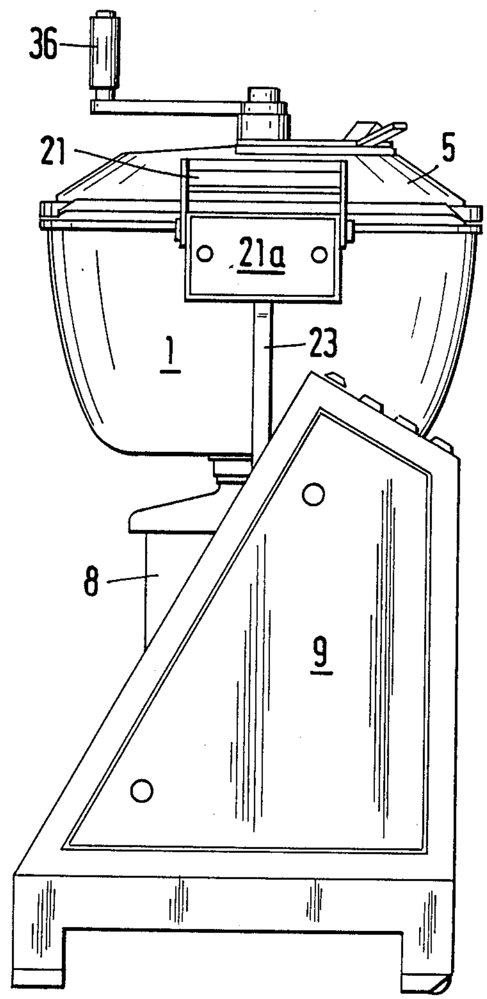
FIG. 2 is a side view from the left in FIG. 1.
Figure 3:
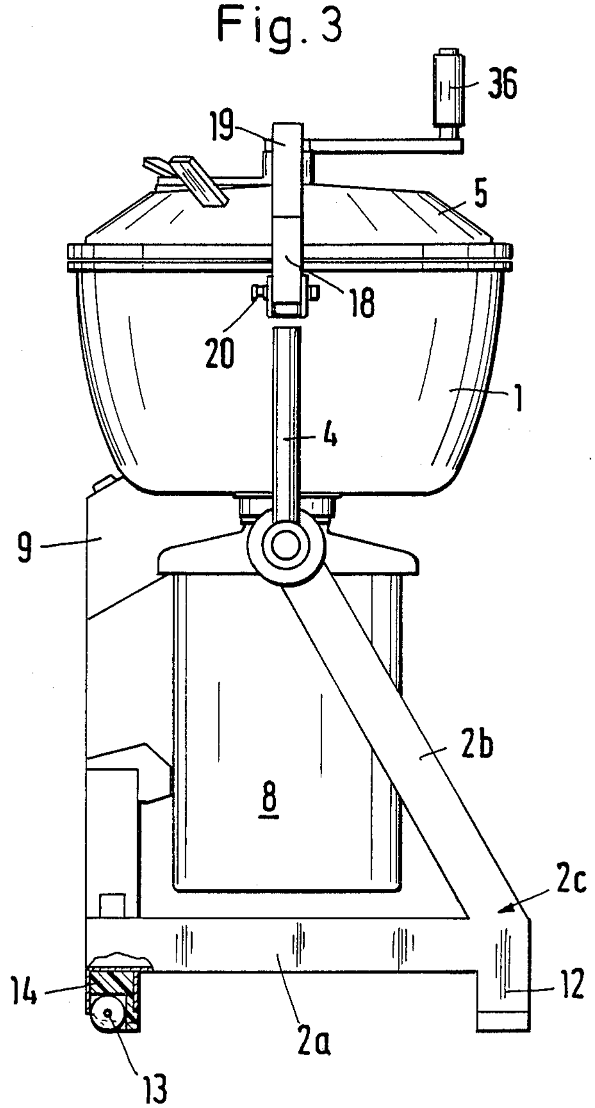
FIG. 3 is a side view and partial cut-away view from the right in FIG. 1.
Figure 4:
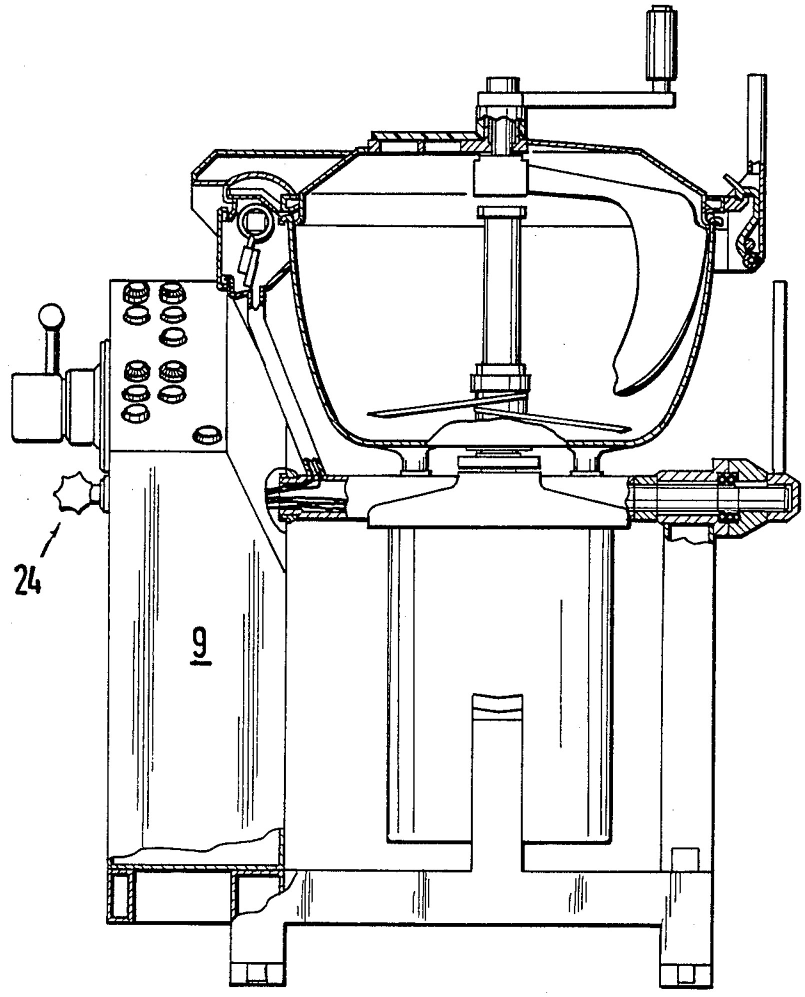
FIG. 4 shows a partially cut-away front view universal kitchen machine equipped with an expanded control box.
Figure 5:
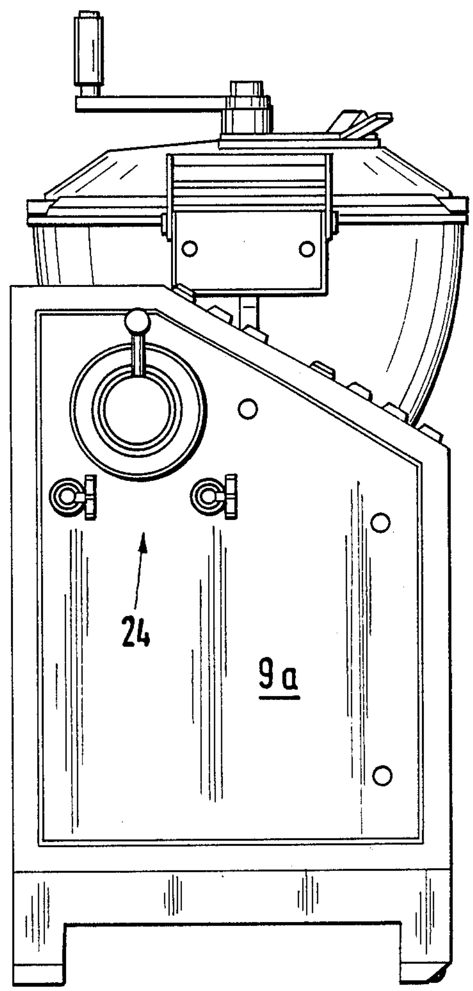
FIG. 5 is a side view from the left in FIG. 4.

The universal kitchen machine shown in FIGS. 1 to 3 is equipped with a relatively small control box 9. FIGS. 5 to 6 show a machine with an enlarged control cabinet comprising a gear motor, and a drive 24 for accessories. The drive 24 extends from the wall 9*a* of the control box facing away from the bowl 1. The drive is also independent from the motor 8 flanged onto the bottom of the bowl.

Figure 8:
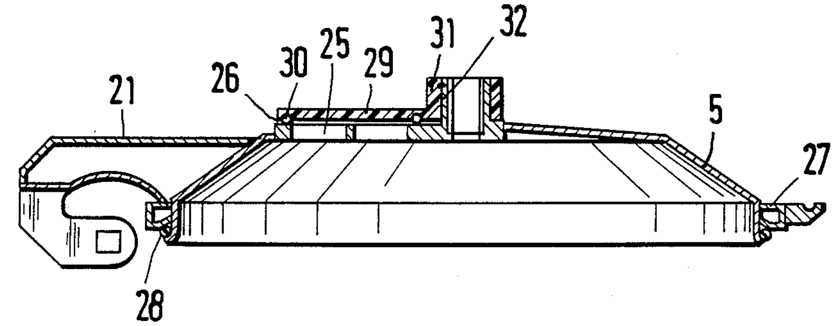
FIG. 8 shows a cross section through the bowl lid according to FIG. 7.

The bowl lid 5 comprises a drawn part made of a chromium-nickel steel and having a punched-out section. A precision cast segment 26 equipped with a plurality of viewing orifices 25, is welded into the punched-out section. A ring with an approximately U-shaped cross-section 27 for holding a rope seal 28 is welded into the periphery of the drawn part (FIG. 8).

Figure 7:
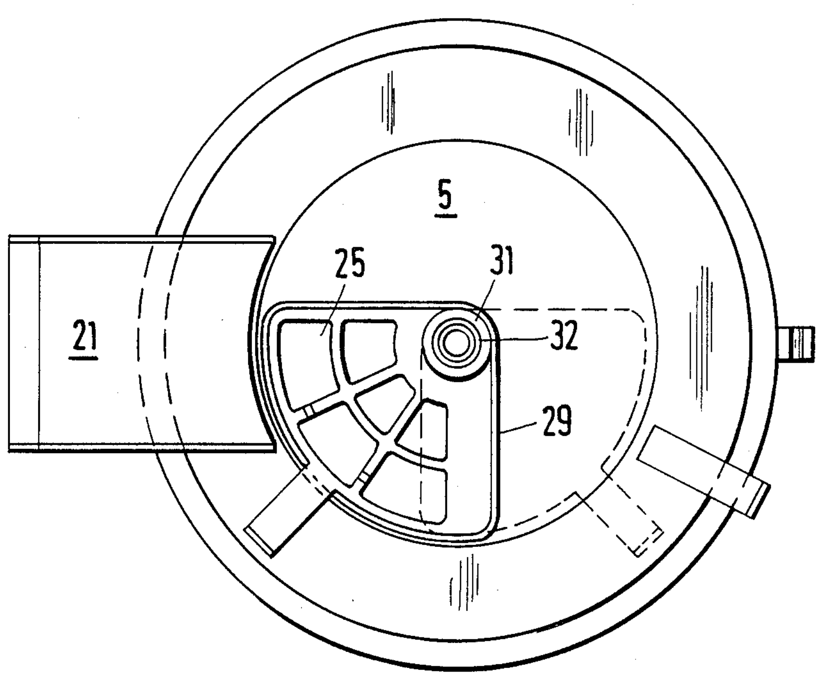
FIG. 7 is a top view of the bowl lid shown in FIG. 1 to 6.
Figure 10:
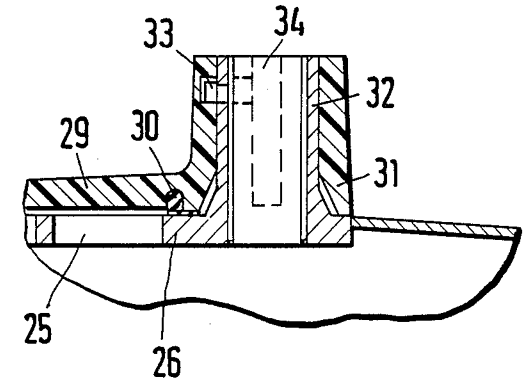
FIG. 10 is an enlarged section of FIG. 8.
Figure 9:
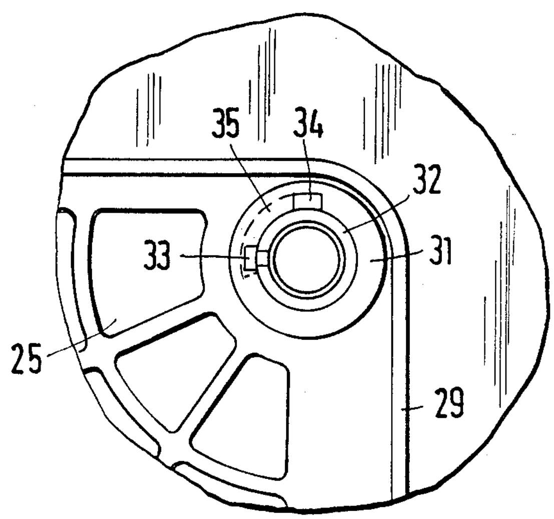
FIG. 9 is an enlarged section of FIG. 7.
Figure 11:
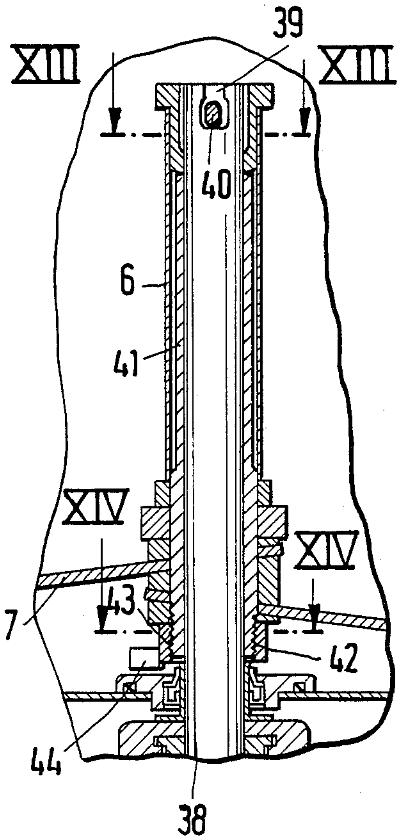
FIG. 11 shows a vertical section through the tool shaft shown in FIGS. 1 and 4.
Figure 12:
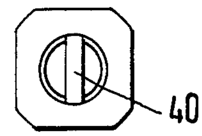
FIG. 12 is a top view of the tool shaft according to FIG. 11.
Figure 13:
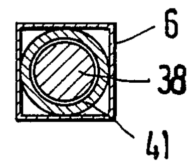
FIG. 13 shows a section along the line XIII—XIII in FIG. 11.
Figure 14:
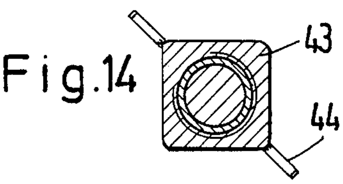
FIG. 14 shows a section along the line XIV—XIV in FIG. 11.

The precision cast segment 26 may be closed by a viewing-cover 29 comprising a transparent synthetic plastic material. The viewing-cover 29 is supported rotatingly on the bowl lid 5 and seated with a round rope seal 30 on the precision cast segment 26. In its closed position, the cover 19 is thus seated in a water spray- and vacuum-tight manner. The viewing-cover 29 is set with a centered bearing bushing 31 onto a hub 32 of the bowl lid 34. A pin 33 engages a vertical groove 34, and, when the viewing-cover 29 is rotated toward its closed position (broken line in FIG. 7), the pin engages a circumferential groove section 35 having a thread-like rise directed against the bowl cover 5. A manual crank 36 is provided for manipulating a conveyor blade 37 arranged in the bowl 1. The crank 36 is supported on the bearing bushing 31 of the viewing cover 29.

A free end of the drive shaft 38 of the motor 8 extends into the bowl 1. This free end comprises an undercut, upwardly-directed radial slot 39. The tool shank 6, which is slipped onto the drive shaft 38 includes a transverse bolt 40 for engaging the radial slot 39. The tool shank 6 comprises a square steel pipe which is placed over and welded to the ends of a bushing 41. The lower end of the bushing 41 is equipped with an external thread 42 onto which a tension nut 43 for securing the tools 7 is screwed. The nut 43 is provided with spinning blades 44 on its outer circumference.

What is claimed is:

1. A universal kitchen machine for the comminution, mixing, kneading, emulsifying and the like of foods, comprising:

a bowl with a generally circular cross-section, and including a bottom and an open top;

a hollow tilting axle having first and second ends, disposed horizontally beneath the bottom of the bowl, connected with the bowl, and functioning to tip the bowl;

a support stand for supporting the second end of the tilting axle;

a closable lid for closing the top of the bowl and having a center;

tool means for processing food disposed within the bowl;

a first drive motor for driving the tool means, connected to the bottom of the bowl and disposed beneath the tilting axle;

a control box integral with the support stand and for supporting the first end of the tilting axle;

switching means for switching the drive motor, disposed in the control box;

a first plurality of electric lines from the motor to the switching means, disposed in the hollow tilting axle; and a first bearing for rotatably supporting the first end of the tilting axle, disposed in the control box.

2. A machine as recited in claim 1, further comprising:

a second bearing for rotatingly supporting the second end of the tilting axle disposed in the support stand opposite the control box; and means for arresting the bowl in any selected tipped position.

3. A machine as recited in claim 2, wherein said support stand includes a base section and said base section of the support stand includes a front part, a rear part and a support member that extends diagonally upwardly from the rear part of the base section toward the front of the machine, wherein the support member of said support stand further comprises a free end for containing said second bearing.

4. A machine as recited in claim 2, wherein said means for arresting comprise a fixed first toothed wheel, a second toothed wheel attached to said hollow tilting axle, a tension lever for engaging the first and second toothed wheels, a spring for biasing the tension lever away from engaging said toothed wheels.

5. A machine as recited in claim 1, wherein said tool means comprises a tool, and a tool shank for supporting the tool.

6. A machine as recited in claim 5, further comprising a drive shaft having a free end for supporting said tool shank and for extending into said bowl, wherein said free end includes an undercut radial slot, wherein said tool shank comprises a transverse bolt for engaging said slot, and wherein said tool is interchangeably mounted on said tool shank.

7. A machine as recited in claim 6, wherein said undercut radial slot is sized to allow a slight relative rotation between said tool shank and said drive shaft, which produces a reverse grip between said transverse bolt and said undercut radial slot.

8. A machine as recited in claim 5, wherein said tool shank has a square cross-section.

9. A machine as recited in claim 8, further comprising a second bushing having an upper and a lower end and being connected with said first drive motor, wherein said tool shank comprises a square, steel pipe welded to both ends of said second bushing.

10. A machine as recited in claim 9, wherein said second bushing is provided with an external thread on its lower end; and further comprising a tension nut for fastening said tools, threaded onto said external thread, and having spinning blades on its outer edges.

11. A machine as recited in claim 1, wherein said support stand includes a base section, and wherein said control box is interchangeably connected with the base section.

12. A machine as recited in claim 11, wherein said base section of said support stand comprises at least two feet having square cross-sections; and further comprising a rubber bumper and a roller, corresponding to each foot.

13. A machine as recited in claim 1, wherein the control box includes a first side facing away from the bowl, wherein the machine further comprises a second drive motor for accessories, and wherein the second drive motor is independent from said first drive motor and extends out of said first side of the control box.

14. A machine as recited in claim 1, further comprising an electronic brake device for said first drive motor disposed in said control box.

15. A machine as recited in claim 14 further comprising:

a first box hinge welded to said closable lid;

a second box hinge associated with said first box hinge;

an electronic safety device associated with said second box hinge;

a second plurality of electrical lines for the electrical safety device; and a water-tight electrical conduit for conducting the second plurality of electrical lines into said hollow tilting axle, wherein said electronic safety device activates said electronic brake via said second plurality of electrical lines whenever said closable lid is opened while said first drive motor is running.

16. A machine as recited in claim 1, wherein said closable lid comprises a drawn part having an edge region, a punched-out section, and a cast segment having viewing orifices and being connected to said punched out section.

17. A machine as recited in claim 16, wherein said drawn part comprises chromium-nickel steel, and wherein said cast segment is welded to said punched-out section.

18. A machine as recited in claim 16, further comprising a first box hinge welded to said drawn part.

19. A machine as recited in claim 18, further comprising a second box hinge associated with said first box hinge, an electrical safety device associated with the second box hinge, a second plurality of electrical lines for the electrical safety device, and a water-tight electrical conduit for conducting the second plurality of electrical lines into said hollow tilting axle.

20. A machine as recited in claim 16, further comprising: a first rope seal; and a ring for containing said seal having an approximately U-shaped cross section, wherein the ring is welded to said edge region of the drawn part.

21. A machine as recited in claim 16, further comprising a viewing-cover for closing said cast segment, wherein the viewing-cover is bearingly supported on said center of said closable lid.

22. A machine as recited in claim 21, further comprising a second rope seal for sealing said viewing-cover onto said cast segment in a water-tight and vacuum-tight manner.

23. A universal kitchen machine for the comminution, mixing, kneading, emulsifying and the like of foods, comprising:

a bowl with a generally circular cross-section, and including a bottom and an open top;

a hollow tilting axle having first and second ends, disposed horizontally beneath the bottom of the bowl, connected with the bowl, and functioning to tip the bowl;

a support stand for supporting the second end of tilting axle;

a closable lid for closing the top of the bowl and having a center comprising:

a drawn part having an edge region, a punched out section, and a cast segment having viewing orifices and being connected to said punched out section, and a viewing-cover for closing said cast segment, wherein the viewing-cover is bearingly supported on said center of said closable lid;

a hub located in the center of said closable lid and having first and second ends, wherein said viewing-cover further comprises a central bearing bushing for slipping onto the first end of said hub;

a pin disposed on one of said hub and said bearing bushing; and a groove on the second end of said hub and said bearing bushing, wherein said groove includes an initial vertical section and a circumferential section having a thread-like rise directed against said closable lid, wherein the pin engages the vertical section of the groove when the viewing-cover is in a position exposing said cast segment, and wherein said pin engages the thread-like section of the groove when the viewing-cover is moved to a position covering said cast segment and creates a positive lock between the viewing-cover and the cast segment.

24. A machine as recited in claim 23, further comprising a conveyor blade for extending into said bowl; and a manual crank supported on said bearing bushing, connected with the conveyor blade, and for manipulating the conveyor blade.

25. A machine as recited in claim 24, wherein said bowl lid comprises an eccentric toggle lever lock having a easily manually actuatable lever handle supported on a rotatable axle.

26. A machine as recited in claim 24, wherein said conveyor blade comprises a synthetic material.

27. A universal kitchen machine for the comminution, mixing, kneading, emulsifying and the like of foods, comprising:

a bowl with a generally circular cross-section, and including a bottom and an open top;

a hollow tilting axle having first and second ends, disposed horizontally beneath the bottom of the bowl, connected with the bowl, and functioning to tip the bowl;

a support stand for supporting the second end of the tilting axle;

a tool means for processing food and disposed within the bowl;

a first drive motor for driving the tool means, connected to the bottom of the bowl and disposed beneath the tilting axle;

a control box integral with the support stand and for supporting the first end of the tilting axle;

a switching means for switching the drive motor, disposed in the control box; and a first plurality of electric lines from the motor to the switching means, disposed in the hollow tilting axle; and a closeable lid for closing the top of the bowl;

an electrical safety means operatively connected to the closeable lid, the electrical safety means comprising a cover device, a brake device disposed in the control box for preventing operation of the first drive motor and a second plurality of electrical lines connecting the cover device to the brake device, whereby the cover device activates the brake device to prevent operation of the first drive motor whenever the closeable lid is open.

28. A universal kitchen machine as claimed in claim 27 wherein the cover device comprises a first box hinge connected to the closeable lid and a second box hinge associated with the first box hinge and connected to the second plurality of electrical lines.

29. A universal kitchen machine as claimed in claim 27, wherein the electrical safety means further comprises a watertight conduit enclosing the second plurality of electrical lines.

30. A universal kitchen machine as claimed in claim 27 wherein the second plurality of electrical lines enters the control box via the hollow tilting axle.

* * * * *